UNITED STATES PATENT OFFICE.

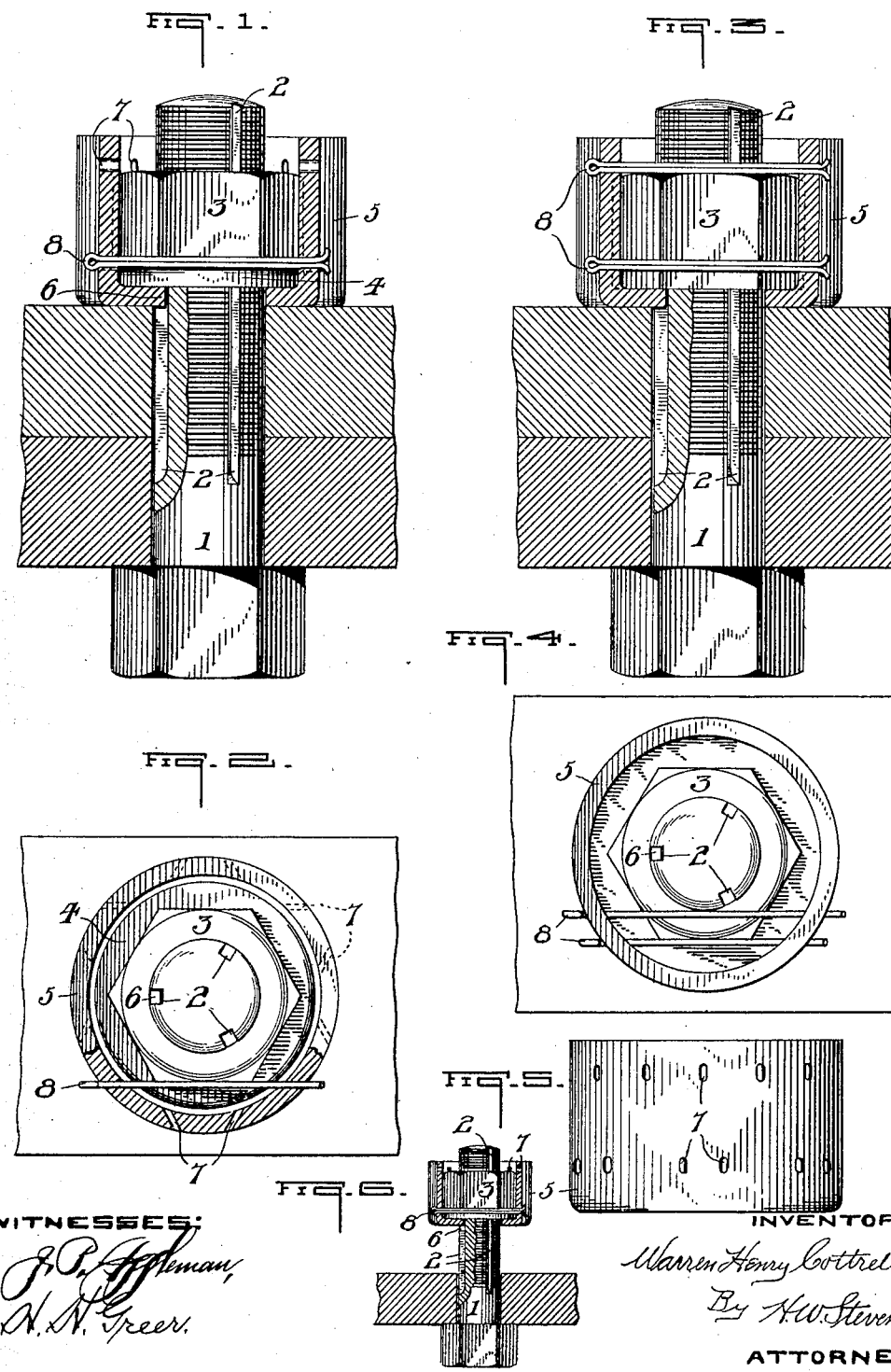

WARREN HENRY COTTRELL, OF CHICAGO, ILLINOIS.

NUT-LOCK.

No. 913,267.  Specification of Letters Patent.  Patented Feb. 23, 1909.

Application filed July 21, 1908. Serial No. 444,645.

*To all whom it may concern:*

Be it known that I, WARREN HENRY COTTRELL, of Chicago, in the county of Cook and State of Illinois, have invented certain new and useful Improvements in Nut-Locks, of which the following is a specification.

My invention relates to certain new and useful improvements in nut locks applicable on machinery, vehicles, or other objects of a similar nature, the idea being to provide a practical and inexpensive means for retaining the nut at any desired position on the bolt, either in suspended position at some distance from the structure to be locked, or in close contact therewith.

A further advantage of my invention is the means I employ for retaining the washer in close contact with the nut.

In the accompanying drawings I have illustrated my invention by several detail views, in which:

Figure 1 is a view, partly in broken formation, showing a flanged nut in locked position on the bolt. Fig. 2 is a top plan view of the same. Fig. 3 is a view similar to Fig. 1 showing a nut, minus the flange, in locked position. Fig. 4 is a top plan view of the same. Fig. 5 is a side elevation of the washer, and Fig. 6 a view in reduced section of a nut held in suspended position on the bolt.

Throughout the different views shown in the drawing the numeral 1 indicates an ordinary headed bolt in the threaded portion of which is formed one, or a plurality, of grooves 2 extending lengthwise of the bolt and preferably the full length of the said threaded portion. The interiorly threaded nut, which may be of any desired form, is designated by the numeral 3. In Fig. 2 is best shown a hexagon nut provided on its lower, or contacting face, with a flange 4.

A cup shaped member or washer 5 designed to fit over the threaded portion of the bolt, prior to the turning on of the nut, is provided on its inner or bottom face with an inwardly projecting lug 6, which registers in one of the grooves 2, and when thus seated prevents the washer from turning on the bolt. It is understood that there may be a plurality of these lugs, if necessary one to enter each groove in the bolt, but for ordinary purposes one will be sufficient to accomplish the desired result. It is intended that this cup shaped washer shall be constructed deep enough so as to extend above the upper surface of the nut when positioned on the bolt. Formed through the walls of this washer 5 are a plurality of apertures 7 extending around the entire circumference thereof, and so formed, and positioned, that those on one side will register and come in alinement with those on the opposite side. For the purpose hereinafter set forth, I intend forming these apertures in two series, the lower ones being at the height of the upper surface of the flange 4, and the top series at the height of the upper face of the nut 3.

The locking member I employ can consist of a cotter pin 8, as shown in the drawings, or any other cheap device, such as a wire nail, and this member seats through the apertures 7 in such a manner as to closely engage across the upper surface of the flange 4 and contact with one of the sides of the nut. As an extra precaution, and secondary locking device, I provide a similar member which passes through apertures in the upper series of holes and closely engages against the top of the nut. In the event of it being found necessary to use still extra precautions for locking the nut, for instance when the vibration was intensified, two more pins could be positioned at the opposite side of the nut.

The cup washer is first placed over the bolt to any predetermined position with the lug 6 engaging in the groove 2, which will thus prevent said washer from turning on the bolt. The nut 3 is next turned on the bolt until it seats in the said cup washer and engages against the bottom of that member. The next step consists in inserting the locking pin 8 through the apertures 7 of the lower series of holes, when it will contact closely with the top of the bottom flange 4, and face of the nut, thereby preventing said nut from turning.

When thus assembled the nut will be held in locked position on the bolt, it being prevented from turning either on or off by reason of the frictional contact of the pin 8, and the cup washer will be held in suspended position owing to the fact of said pin contacting against the upper face of the flange 4, and acting as a suspension bar to hold the said washer up against the bottom of the nut. The said washer is prevented from turning on the bolt by reason of the lug 6 engaging in the slot 2. This positive locking feature will be apparent even though it is desired to hold the nut in suspended position on the bolt, as shown in Fig. 6, or else in contact with an object to be held as in Fig. 1.

In the use of an ordinary nut as shown in Fig. 3, and dispensing with the flanged nut, it is necessary to utilize at least two locking pins, the lower one preventing the nut from turning, and the upper one acting to suspend and hold the washer against the nut. In this manner I provide for the use of both a flanged and ordinary nut, thereby insuring a positive and safe locking device under all ordinary conditions and usages.

What I claim, and desire to secure by Letters Patent, is:

1. In a nut lock, the combination with a flanged nut and a threaded bolt having one or a plurality of grooves formed therein, of a cup shaped washer designed to seat over the bolt and receive the nut, said washer having a lug formed in the bottom thereof to engage in one of the grooves, and provided with a plurality of apertures through the walls thereof; and a locking member seated through the apertures and engaging the upper surface of the flange and side of the nut; substantially as described and shown.

2. In a nut lock, the combination with a nut and threaded bolt having one or a plurality of grooves formed therein, of a cup shaped washer designed to seat over the bolt and receive the nut, said washer having a lug formed in the bottom thereof to engage in one of the grooves, said washer extending above the nut, and provided with a double series of apertures through the walls thereof; a locking member seated through the apertures in the lower series engaging the side of the nut; and a second locking member seated through apertures in the upper series engaging the top of the nut.

In testimony whereof I affix my signature in presence of two witnesses.

WARREN HENRY COTTRELL.

Witnesses:
BEATRICE FITZGERALD,
H. W. STEVENSON.